F. C. RANDALL.
Barbed Fences.
No. 197,172.      Patented Nov. 13, 1877.
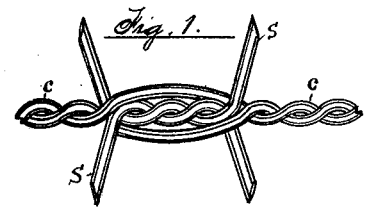
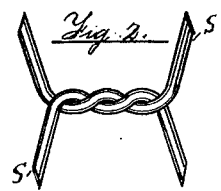
Witnesses
Thos. H. Hutchins
Wm. J. Hutchins
Inventor
Frank C. Randall

UNITED STATES PATENT OFFICE.

FRANK C. RANDALL, OF JOLIET, ILLINOIS.

IMPROVEMENT IN BARBED FENCES.

Specification forming part of Letters Patent No. 197,172, dated November 13, 1877; application filed June 21, 1877.

*To all whom it may concern:*

Be it known that I, FRANK C. RANDALL, of the city of Joliet, in Will county, State of Illinois, have invented certain Improvements in Barb Fences, the description and operation of which I will proceed to explain, reference being had to the annexed drawings, making a part of this specification, in which—

Figure 1 is a perspective view of the fence with the barb attached, and Fig. 2 a perspective view of the barb separate from the fence.

The object of this invention is to furnish a cheap, substantial fence with barbs, for a stock fence, constructed in such a manner as to be more durable than most others of its class.

In the drawings, $c$ represents a wire cable, consisting of two ordinary wires twisted together, and having intertwined lengthwise between them, at short intervals, barbs constructed of two short pieces of wire, twisted together in such a manner that the four ends of the two wires may be turned out at right angles with the length of the fence to form barbs, (being cut in a diagonal direction, so as to be sharp,) as shown in Fig. 2.

The manner of application of the barb to the fence is shown particularly in Fig. 1, being twisted lengthwise in between the two wires of the cable $c$, in such a manner that the wires of the cable $c$ rest in the crotch at either end of the barb formed by the two legs S forming the barbs.

By this construction there can be no getting loose of the barb to fall out; and, also, there is no loss of material in the construction of the barb, being formed of wire that is cut the exact length needed, and then twisted together in the form shown.

Having thus described my invention, what I claim as new, and desire to secure by Letters Patent, is as follows:

The barb S, constructed of two pieces of wire twisted together, leaving the four ends of the two wires turned out to form barbs, and twisted laterally in between the two wires of the cable $c$, in the manner and for the purpose set forth.

FRANK C. RANDALL.

Witnesses:
   THOS. H. HUTCHINS,
   WM. J. HUTCHINS.